United States Patent
Liu

(10) Patent No.: US 8,479,644 B2
(45) Date of Patent: Jul. 9, 2013

(54) ASSEMBLY STRUCTURE OF RIGID BODY AND ELASTIC BODY

(76) Inventor: Ming-Tung Liu, Taipei (TW)

(*) Notice: Subject to any disclaimer, the term of this patent is extended or adjusted under 35 U.S.C. 154(b) by 533 days.

(21) Appl. No.: 12/695,165

(22) Filed: Jan. 28, 2010

(65) Prior Publication Data
US 2011/0182690 A1 Jul. 28, 2011

(51) Int. Cl.
*A47J 31/02* (2006.01)
(52) U.S. Cl.
USPC .............................. 99/306; 99/323
(58) Field of Classification Search
USPC .. 403/296, 343, 361, 288, 292, 293; 285/219, 285/220; 99/306, 323, 299; 251/82, 76; 137/533.15
See application file for complete search history.

(56) References Cited

U.S. PATENT DOCUMENTS

| | | | | |
|---|---|---|---|---|
| 885,037 A * | 4/1908 | Glover | | 99/298 |
| 2,626,342 A * | 1/1953 | Miller | | 219/436 |
| 3,823,656 A * | 7/1974 | Vander Veken | | 99/295 |
| 4,690,961 A * | 9/1987 | Cole et al. | | 523/440 |
| 5,064,980 A * | 11/1991 | Grossman et al. | | 219/689 |
| 5,813,317 A * | 9/1998 | Chang | | 99/285 |
| 5,826,493 A * | 10/1998 | Tien Lin | | 99/306 |
| 5,862,739 A * | 1/1999 | Lin | | 99/285 |
| 5,931,329 A * | 8/1999 | Wu | | 220/212 |
| 6,058,827 A * | 5/2000 | Lin Tien | | 99/299 |
| 6,164,190 A * | 12/2000 | Tien Lin | | 99/299 |
| 6,298,771 B1 * | 10/2001 | Calvento | | 99/323 |
| 6,327,965 B1 * | 12/2001 | Lin Tien | | 99/299 |
| 6,805,040 B1 * | 10/2004 | Chang et al. | | 99/285 |
| 2009/0272276 A1 * | 11/2009 | Lin Tien et al. | | 99/298 |
| 2010/0263548 A1 * | 10/2010 | Kokatsu et al. | | 99/306 |

* cited by examiner

*Primary Examiner* — Michael P Ferguson
*Assistant Examiner* — Nahid Amiri
(74) *Attorney, Agent, or Firm* — Bacon & Thomas, PLLC

(57) ABSTRACT

An assembly structure of a rigid body and an elastic body is provided. The rigid body made of glass or ceramics has a chamber and an opening exposing the chamber. The elastic body made of plastics has an indentation and a through hole inside the indentation. The assembly structure further contains an interface element attached to a bottom side of the chamber and has an extension element corresponding to the opening of the chamber. The interconnection between the rigid and elastic bodies is achieved by joining the extension element with the indentation so that the rigid and elastic bodies could be easily put together and separated. The advantages of the rigid body such as robust to deformation and fine surface finish are thereby combined with the advantages of the elastic body such as easy shaping and assembly.

5 Claims, 7 Drawing Sheets

ASSEMBLY STRUCTURE OF RIGID BODY AND ELASTIC BODY

(a) TECHNICAL FIELD OF THE INVENTION

The present invention generally relates to an assembly structure, and especially relates to an assembly structure of a rigid body and an elastic body so that they could be easily assembled and dismantled.

(b) DESCRIPTION OF THE PRIOR ART

Rigid bodies such as those made of glass or ceramics are usually robust to high temperature, not easy to age and change color, and with fine surface finish. However, the drawback is that rigid body is fragile and difficult to form into a complex shape. Therefore the production cost is usually high.

Elastic bodies such as those made of plastics are robust to impact, ductile, easy to form into various shapes. However, they are susceptible to high temperature, easy to age and change color, and with inferior surface finish.

The rigid and elastic bodies are therefore compliments. Many objects are as such made by joining some rigid and elastic bodies together by adhesives. Yet either the rigid or the elastic bodies cannot be changed easily and separately.

SUMMARY OF THE INVENTION

Therefore, a novel assembly structure of a rigid body and an elastic body so that they could be easily assembled and dismantled. The assembly structure therefore combines the advantages of both the rigid and elastic bodies. According to the present invention, the rigid body has a chamber and an opening exposing the chamber. The elastic body has an indentation and a through hole inside the indentation. The assembly structure further contains an interface element attached to a bottom side of the chamber and has an extension element corresponding to the opening of the chamber. The interconnection between the rigid and elastic bodies is achieved by joining the extension element with the indentation so that the rigid and elastic bodies could be easily put together and separated.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2A is a sectional diagram showing an elastic pad element of the assembly structure of FIG. 1.

DETAILED DESCRIPTION OF THE PREFERRED EMBODIMENTS

Figure 1:
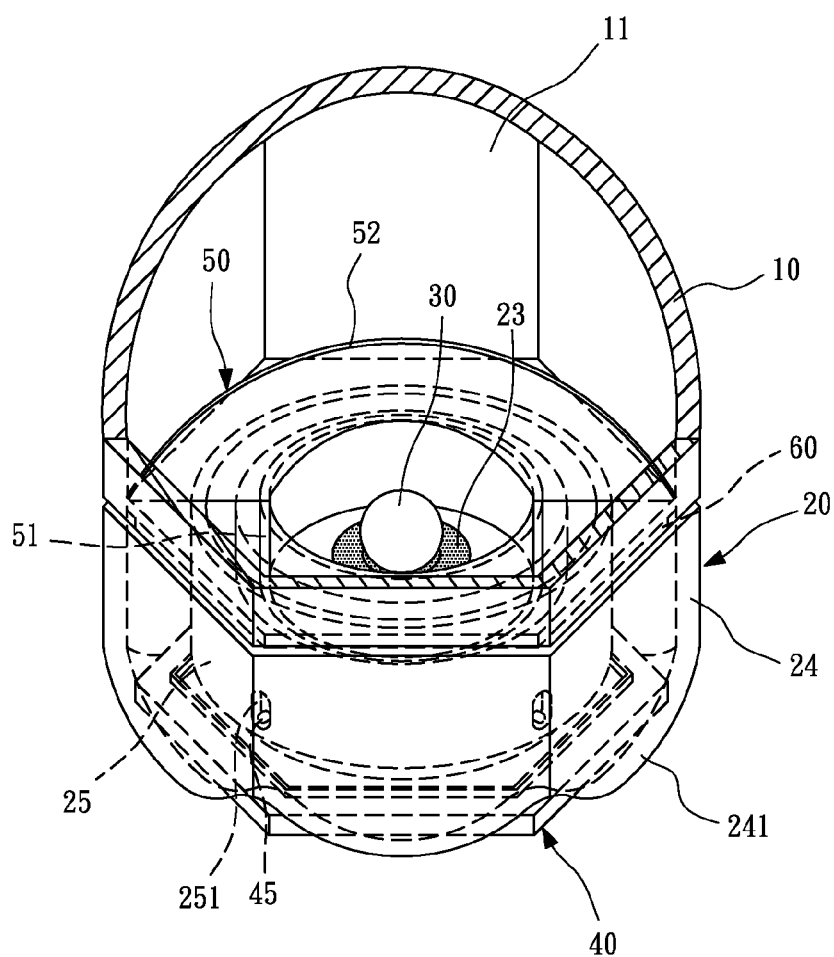
FIG. 1 is a perspective diagram showing an assembly structure of a rigid body and an elastic body according to an embodiment of the present invention.
Figure 2:
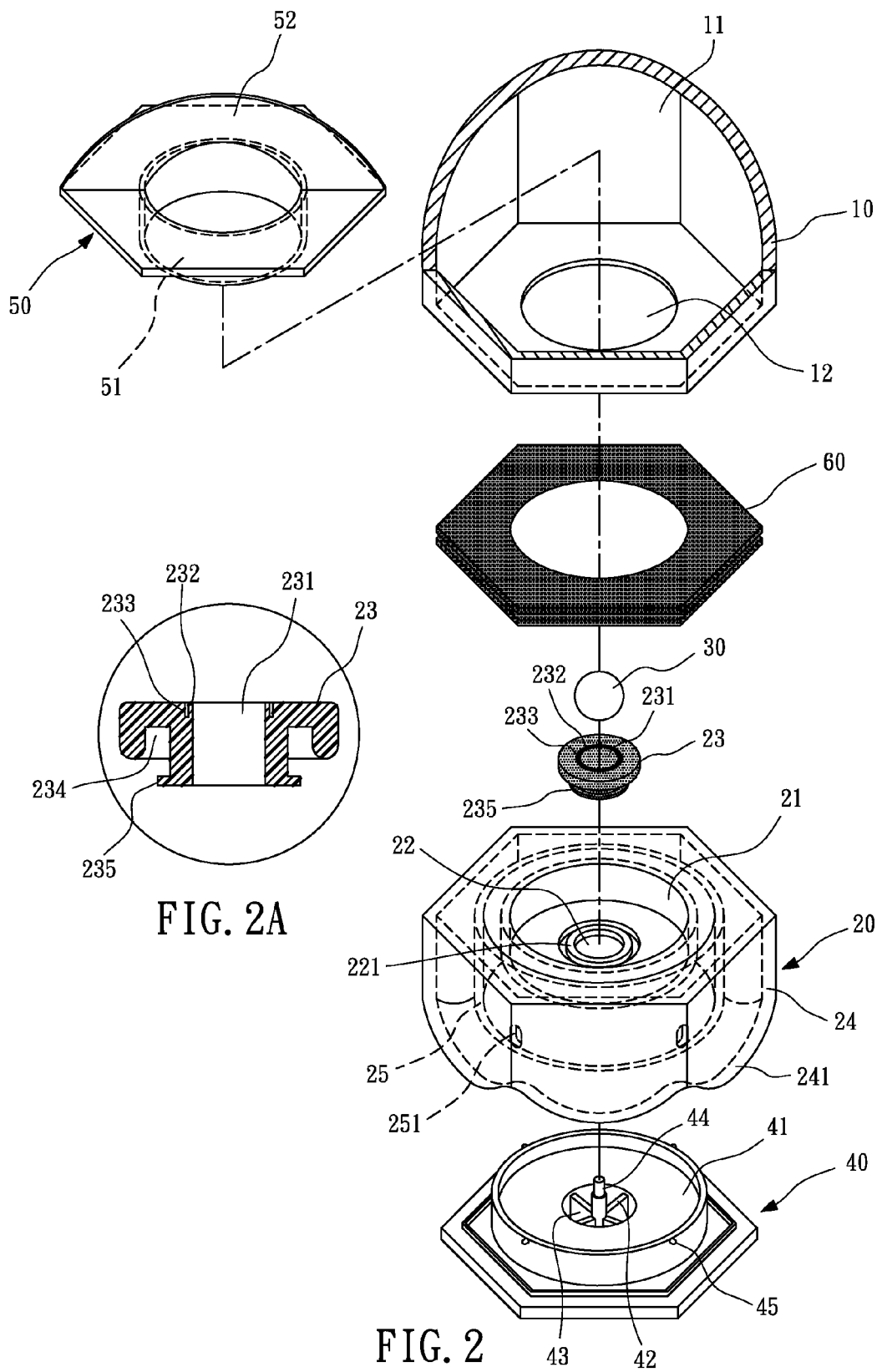
FIG. 2 is a perspective break-down diagram showing the various components of the assembly structure of FIG. 1.
Figure 3:
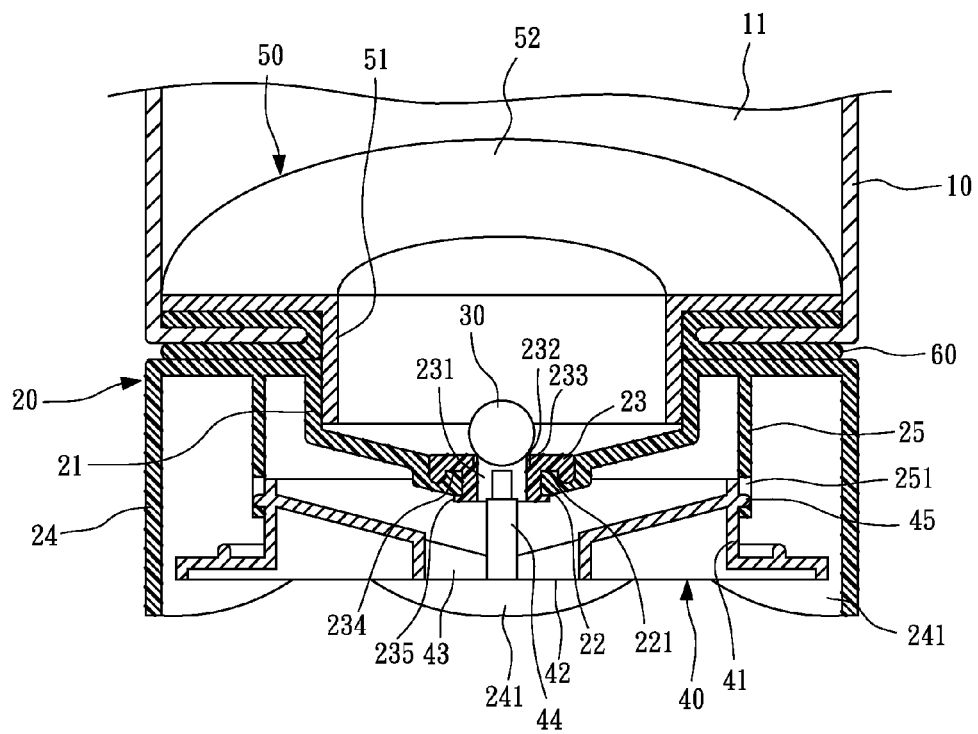
FIG. 3 is a sectional diagram showing part of the assembly structure of FIG. 1.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1, 2, 2A, and 3, an assembly structure according to the present invention contains a rigid body 10, an elastic body 20, a plug element 30, a base member 40, an interface element 50, and a washer 60.

The rigid body 10 is made of glass, ceramics, metal, or wood. The rigid body 10 contains a chamber 11 inside with an opening 12 that connect the chamber 11 to outside of the rigid body 10.

The elastic body 20 is made of plastics. The elastic body 20 has an indentation 21 with a center hole 22 inside. An aperture of the hole 22 is configured with a ring wall 221. Embedded in the hole 22 is an elastic pad element 23 with a through channel 231. Around an aperture 232 at an end of the channel 231, a ring groove 233 is configured so that the aperture 232 has some appropriate elasticity. Around the groove 233, the pad element 23 further has a ring track 234 for receiving the ring wall 221. At the other end of the channel 231, a flange 235 is provided. As such, the pad element 23 could be tightly embedded in the hole 22. The elastic body 20 has a circumferential outer wall 24 including a number of wall pieces 241 for reliably and steadily supporting the elastic body 20 when it is placed on a surface. The elastic body 20 further contains an inner ring wall 25 with a number of notches 251 around its circumference.

The plug element 30 is placed on the aperture 232 of the pad element 23 above the channel 231. The aperture 232 is thereby elastically expanded to tightly interface with the plug element 30 and seal the channel 231. In an alternative embodiment, the pad element 23 is omitted and the plug element 30 is immediately interfaced with the hole 22.

The base member 40 is placed inside the elastic body 20 and surrounded by the outer wall 24. The base member 40 contains a main piece 41 with a center hole. Inside the hole, there is a pillar 44 with a number of radially extended fins 42 partitioning the center hole into a number of through chambers 43. Around the main piece 41, a number of tabs 45 are provided for embedding into the notches 251. The tabs 45 are allowed to slide inside their corresponding notches 251 so that the base member 40 is able to move up and down within the elastic body 20. The pillar 44 is threaded through the channel 231. As the base member 40 moves upward, the pillar 44 pushes the plug element 30 away to open the channel 231.

The interface element 50 is attached to a bottom side of the chamber 11. Corresponding to the opening 12, an extension element 51 (i.e., a tube in the present embodiment) is provided and received by the indentation 21 of the elastic body 20. The extension element 51 could as such be tightly joined with the indentation 21.

The washer 60 could be sandwiched between the rigid body 10 and the elastic body 20 for enhanced tightness and anti-leakage.

By the tight interconnection between the extension element 51 and the indentation 21, the present invention allows a rigid body having the advantages of robust to deformation and superior surface finish to detachably join with an elastic body having the advantages of flexible shaping and easy assembly.

To make the interconnection between the extension element 51 and the indentation 21, some adhesive could be applied.

Figure 4:
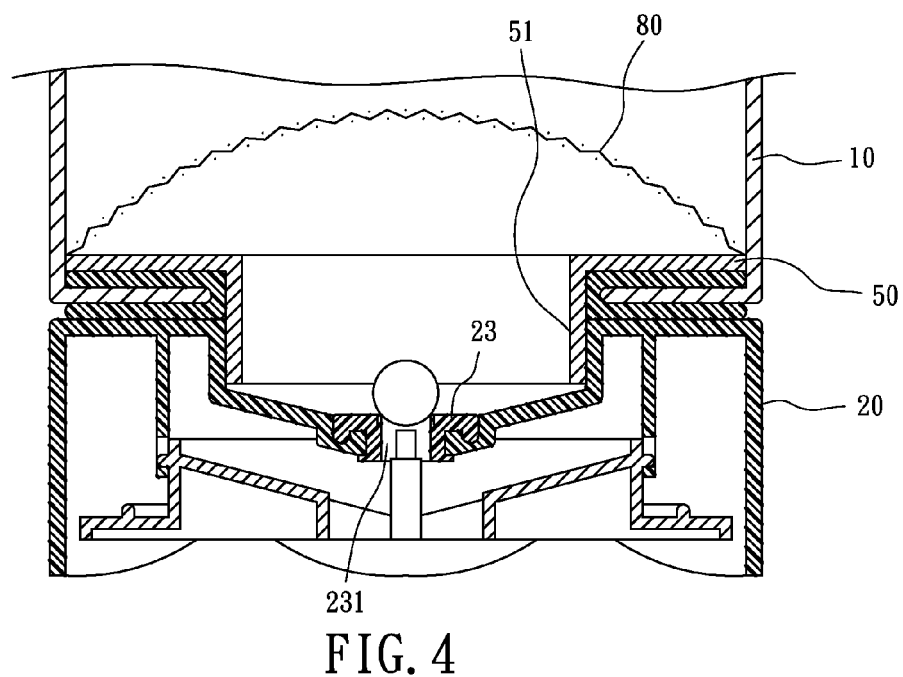
FIG. 4 is a sectional diagram showing part of the assembly structure according to another embodiment of the interconnection between the rigid and elastic bodies.

In an alternative embodiment as shown in FIG. 4, the handle 52 is omitted and a dome-like screen 80 is provided so as to prevent some large objects inside the chamber 11 to block the channel 231.

Figure 5:
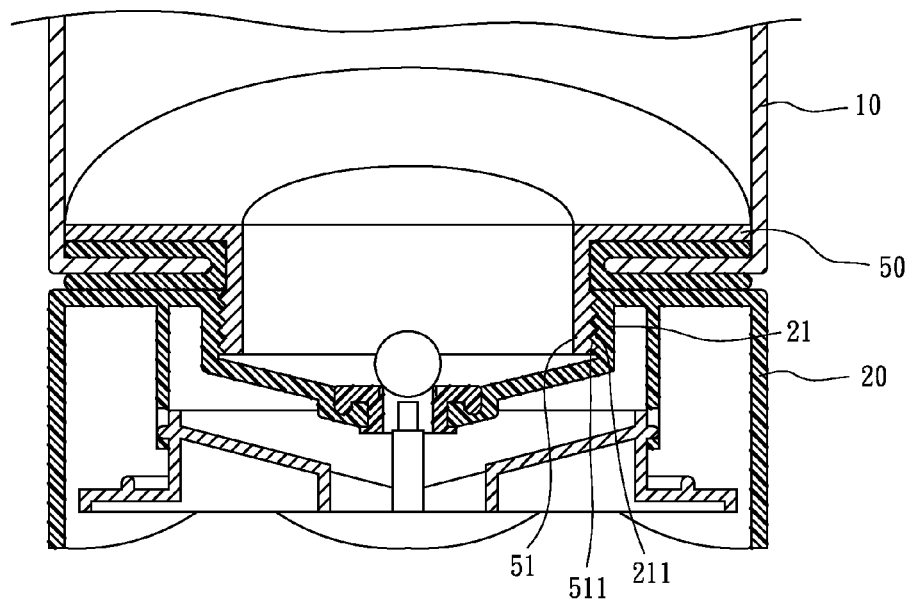
FIG. 5 is a sectional diagram showing part of the assembly structure according to another embodiment of the interconnection between the rigid and elastic bodies.

In yet another alternative embodiment as shown in FIG. 5, threads and grooves 511 and 211 are provided on the extension element 51 and the indentation 21 so that they could be twisted and joined together.

Figure 6:
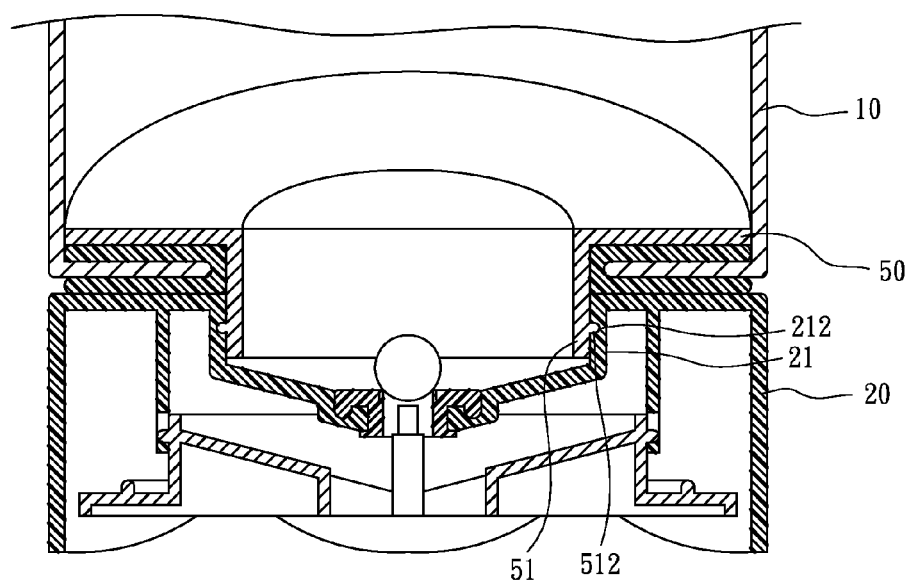
FIG. 6 is a sectional diagram showing part of the assembly structure according to another embodiment of the interconnection between the rigid and elastic bodies.

Alternatively, as shown in FIG. 6, a circumferential rib 512 and a circumferential groove 212 are provided on the extension element 51 and the indentation 21 so that they could be easily snapped together.

Figure 7:
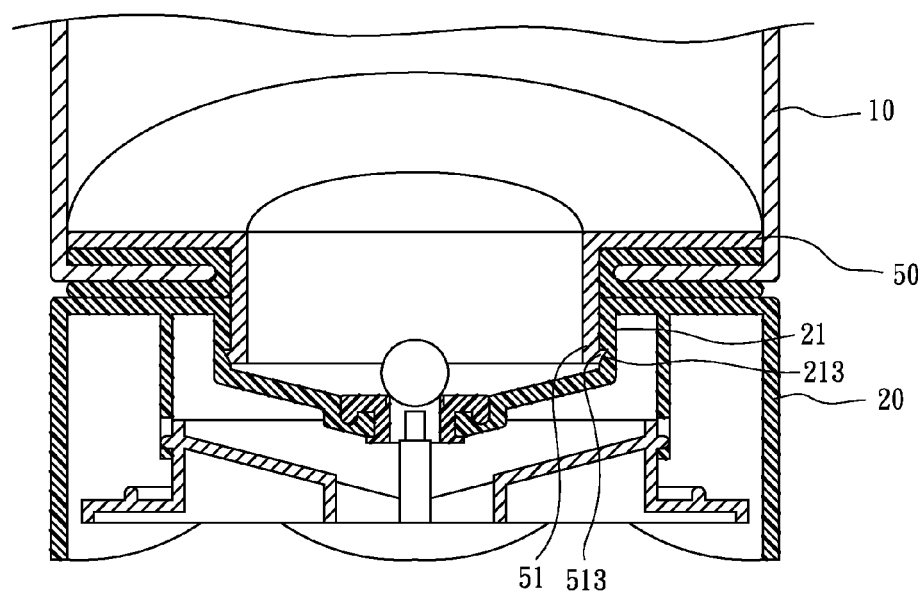
FIG. 7 is a sectional diagram showing part of the assembly structure according to another embodiment of the interconnection between the rigid and elastic bodies.

Similarly, as shown in FIG. 7, a circumferential flange 513 of the extension element 51 is used to lock into a corresponding circumferential groove 213.

Figure 8:
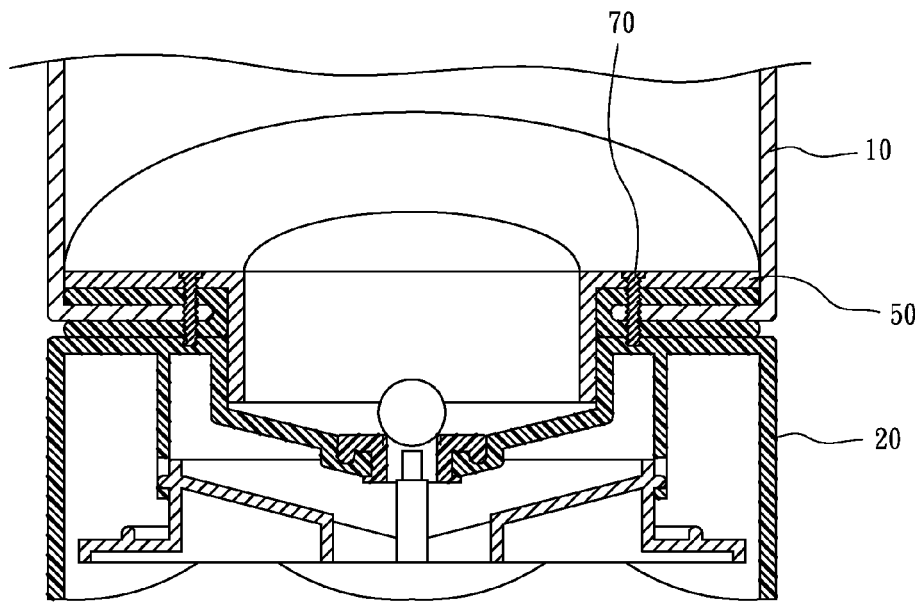
FIG. 8 is a sectional diagram showing part of the assembly structure according to another embodiment of the interconnection between the rigid and elastic bodies.

In another embodiment as shown in FIG. 8, fastening elements 70 are run through the rigid body 10, the elastic body 20, and the interface element 50, so as to tie them tightly together.

Figure 9:
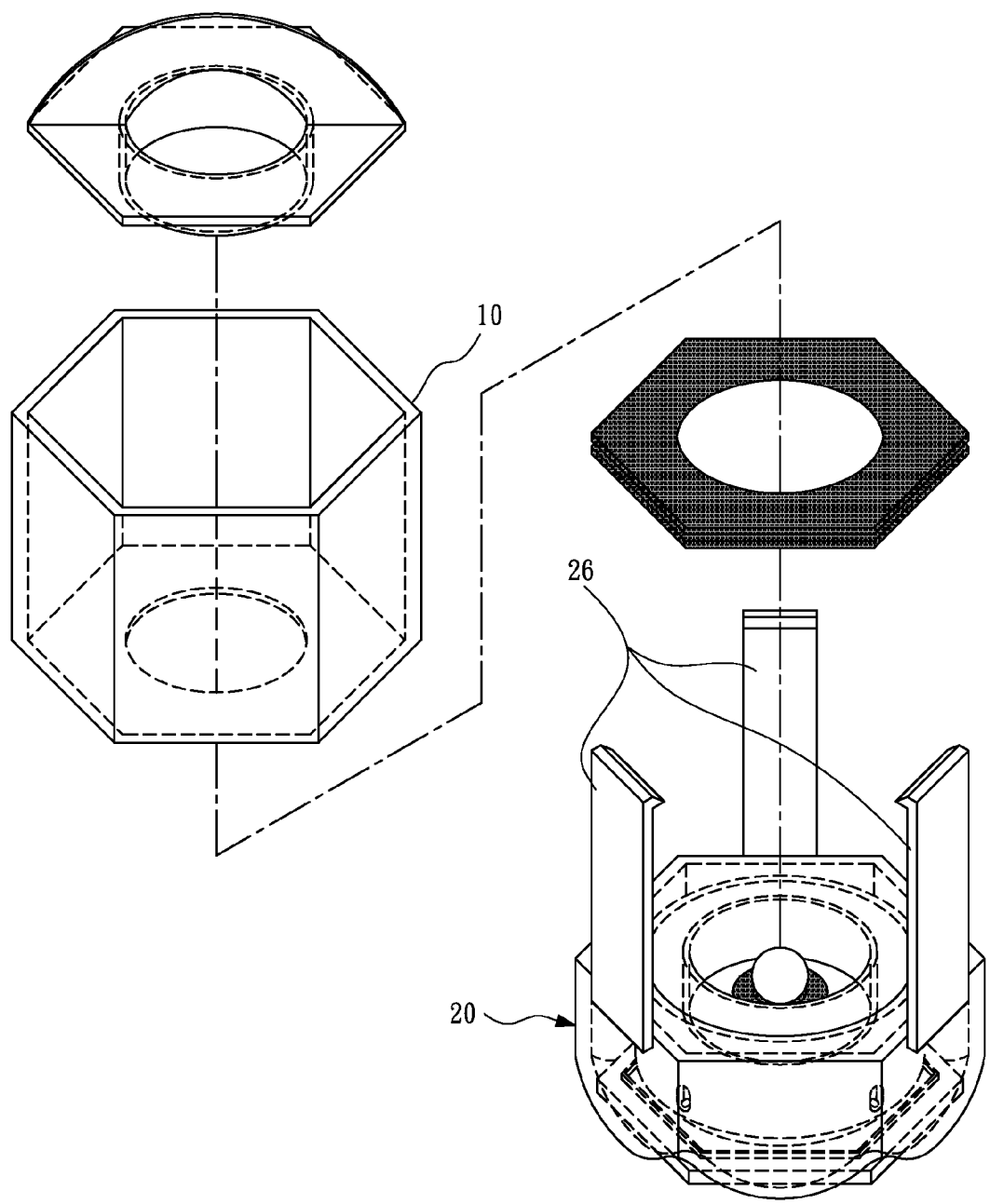
FIG. 9 is a perspective diagram showing an assembly structure of a rigid body and an elastic body according to alternative embodiment of the present invention.
Figure 10:
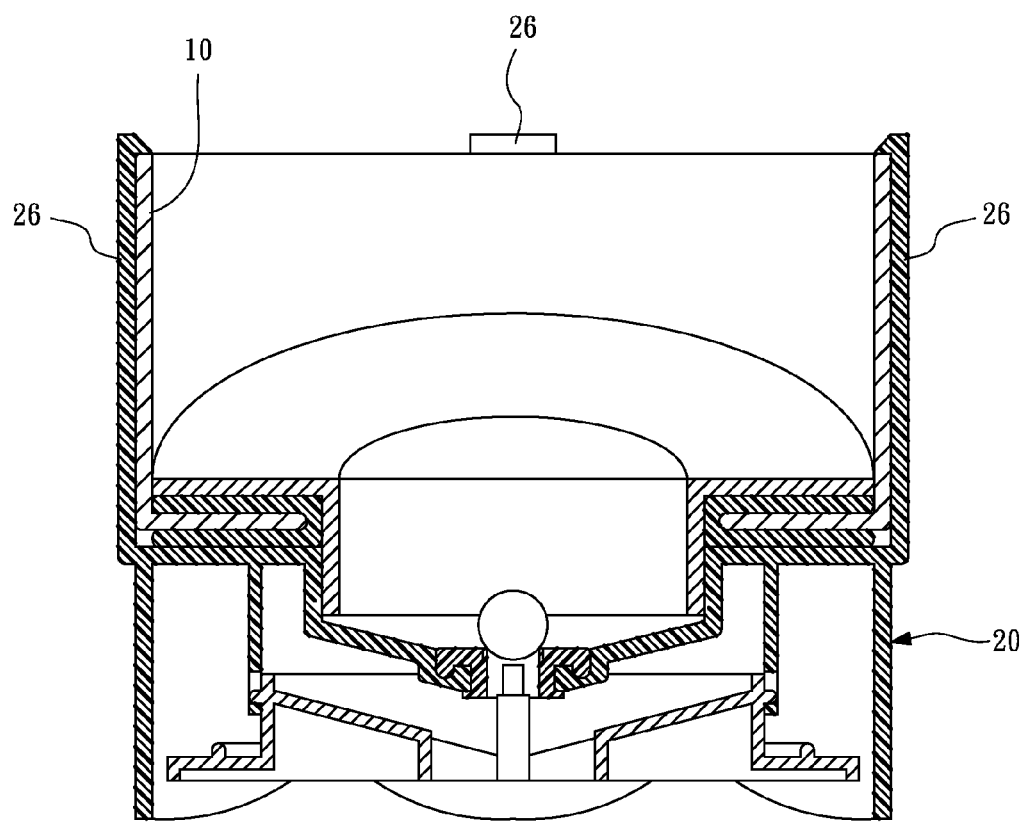
FIG. 10 is a sectional diagram showing part of the assembly structure of FIG. 9.

Additionally, as shown in FIGS. 9 and 10, a number of hook elements 26 are extended from the circumference of the elastic body 20 to lock a top rim of the rigid body 10 to further enhance the interconnection between the rigid body 10 and the elastic body 20.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An assembly structure, comprising:
   a rigid body having a chamber facing a top side of the rigid body and an opening disposed at a bottom side of the rigid body for communicating with the chamber;
   an interface element received in the chamber and attached to a bottom surface of the chamber, and having an extension element extending downward through the opening of the rigid body;
   an elastic body having an indentation disposed at a top side of the elastic body and a through hole disposed inside said indentation, and having an inner wall facing a bottom side of the elastic body and disposed with a plurality of notches, wherein the elastic body can be detachably joined with the rigid body through interconnecting the indentation with the extension element, and the elastic body is then served as a base of the rigid body; and
   a pad element made of an elastic material and embedded in the through hole, wherein the pad element has a through channel disposed therein;
   a plug element capable of being moved and tightly sealing a top end of the through channel; and
   a base member having a plurality of tabs for movably embedding into the notches, respectively, such that the tabs are allowed to slide inside their corresponding notches so that the base member is able to move up and down within the elastic body and having a pillar on a top side of the base member capable of passing through the through channel to move the plug element and then to open the through channel when the elastic body is moved downward toward the base member.

2. The assembly structure according to claim 1, wherein threads and grooves are provided on said extension element and said indentation, respectively, and can be connected together for interconnecting the extension element and the indentation.

3. The assembly structure according to claim 1, wherein said extension element and said indentation are connected together by an adhesive applied therebetween.

4. The assembly structure according to claim 1, wherein a ring wall is provided around said through hole inside said indentation; said pad element has a ring track for engaging with said ring wall; said pad element has a flange around a bottom end of the through channel, so that said pad element is tightly embedded in said through hole inside said indentation through the flange.

5. The assembly structure according to claim 1, wherein, a ring groove is provided on a top end of said pad element around the through channel.

* * * * *